Oct. 1, 1946.     F. E. BERTSCHINGER     2,408,547
COUPLING
Filed Aug. 18, 1944
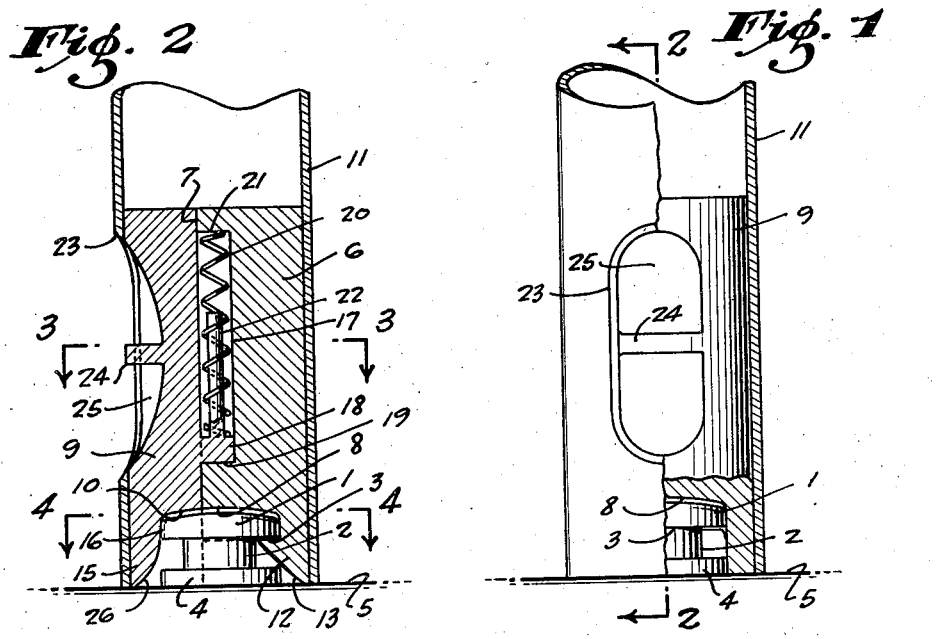
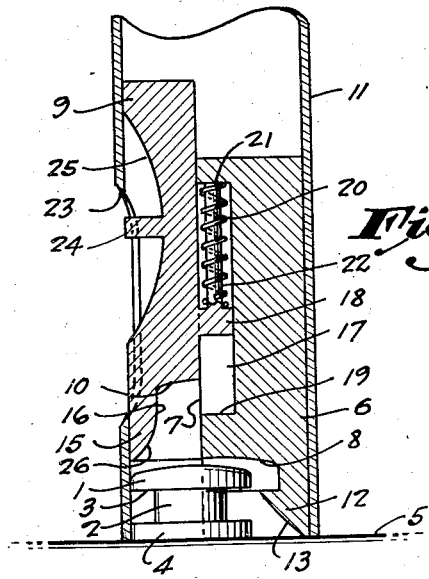
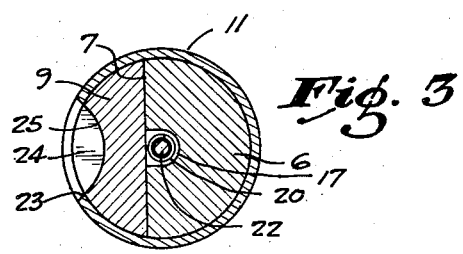
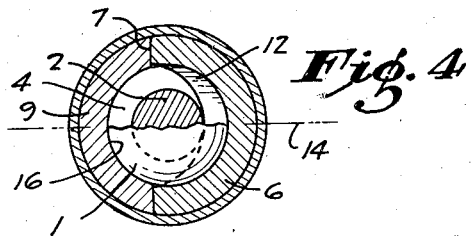
INVENTOR
Frederick E. Bertschinger
BY John Flam
ATTORNEY Patented Oct. 1, 1946

2,408,547

UNITED STATES PATENT OFFICE 2,408,547

COUPLING

Frederick E. Bertschinger, Los Angeles, Calif., assignor to Standard Cabinet Works, Inc., Los Angeles, Calif., a corporation of California Application August 18, 1944, Serial No. 549,979

10 Claims. (Cl. 287—20)

This invention relates to a coupling device, and particularly to one that can be quickly disengaged or engaged.

Couplings of this character find many uses; for example, the coupling elements may be used to join adjacent pieces of shafting, rods, tubes, or flexible elements, such as cords or ropes. They may also be used to affix any such pieces or elements to a floor or wall.

It is one of the objects of this invention to provide a simple and inexpensive coupling of this character.

It is another object of this device to provide a coupling that can be engaged by a mere movement of the coupling elements toward each other, no great care being taken to align the elements. Furthermore, the coupling remains effective until a locking member is intentionally moved to a releasing position.

This invention possesses many other advantages, and has other objects which may be made more clearly apparent from a consideration of one embodiment of the invention. For this purpose there is shown a form in the drawing accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawing:

Figure 1 is an elevation, partly in section, of a coupling embodying the invention, and showing the coupling elements in full engagement;

Fig. 2 is a longitudinal sectional view, taken along plane 2—2 of Fig. 1;

Figs. 3 and 4 are sectional views, taken respectively along correspondingly numbered planes of Fig. 2; and Fig. 5 is a view similar to Fig. 2, but illustrating the manner in which the coupling elements may be disengaged.

One of the coupling elements is provided with a circular head 1 mounted on a stem 2. An annular shoulder 3 is formed underneath the head 1 between the edge of the head and stem 2. This coupling element may be appropriately fastened to a rod, or shaft, or flexible element, such as a cable or rod. In the present instance, however, the coupling element is shown as supported by the aid of a flange 4 fastened to a floor 5. The other coupling element, co-operating with the head 1, may be utilized for an upright support, or the like, rising from the floor 5. Such a support may form a leg of a folding bench or table, or the like.

The co-operating coupling member has two main parts which, together, define a socket for the head 1. One of these parts 6 has an exterior cylindrical surface and a flat face 7. This flat face 7 is defined by a plane that passes somewhat beyond the center of the cylindrical surface, as shown most clearly in Fig. 3.

In the lower end of the part 6 there is a recess 8 slightly domed to accommodate the correspondingly domed upper surface of head 1. The other part 9 of the co-operating coupling member is also provided with a lower surface 10 that, together with the surface 8, defines a circular recess or socket for the head 1. The members 6 and 9, as shown most clearly in Fig. 3, together form a substantially continuous cylindrical surface split along the surface 7, and are accommodated in a tubular member 11. Member 6 is securely attached within the tube 11, and member 9 is longitudinally movable therewith. In this way, the continuity of the socket or recess 8—10 is interrupted when the member 9 is lifted (see Fig. 5).

The head 1 is locked against removal from the socket or recess 8 by a projection or extension 12 attached to the part 6. This extension, as shown most clearly in Fig. 4, has a crescent-shaped area adapted to engage the annular shoulder 3. A sloping surface 13 defines the lower side of projection 12. The widest surface of the crescent-shaped area occurs along that line 14 (Fig. 4), which bisects the members 6 and 9. This, however, narrows virtually to a point where it meets the flat side 7 of member 6.

When the member 9 is in the operative position of Fig. 2, the head 1 cannot be moved out of the socket 8—10; thus, member 9 serves as a locking bolt. The restraint against removal of head 1 is imposed by the extension 15 carried at the lower extremity of the lock member 9. This extension 15 defines the cylindrical surface 16 (see also Figs. 2, 4, and 5) that co-operates with the periphery of the head 1. Accordingly, in order to release the head 1, the member 9 must be moved upwardly to about the position illustrated in Fig. 5. In this position, removal of the head 3 past the projection 12 is permitted after a slight relative lateral movement between the coupling element 1 and the socket.

The tube 11 extends substantially to the lower ends of the members 6 and 9. When the locking member 9 is moved to the upper position, as shown in Fig. 5, the interior surface of the tube 11 defines, with the projection 12, a space large enough for the entry and removal of the head 3.

Although the member 9 may be adequately guided for longitudinal movement within the tube 11, there are additional provisions for this. Thus, a longitudinal groove 17 (Figs. 2 and 3) is provided in the face 7 of member 6. A projection 18, carried on the co-operating portion of the member 9, slides within this groove. The bottom surface 19 of the groove 17 serves as a stop for projection 18, to position the member 9 properly with respect to the stationary member 6. A compression spring 20 is provided in the groove 17 above the projection 18, urging the member 9 to the engaged position of Fig. 2. The upper end of the spring 20 abuts against the surface 21 defining the upper end of the groove 17. This upper surface 21 also serves effectively as a stop for upward movement of the member 9. For this purpose a stud or pin 22 is attached to the projection 18, and is accommodated within spring 20. Surface 21 serves as a stop against the upper end of pin 22 upon sufficient upward movement of lock member 9.

In order to permit ready manipulation of the member 9, an oval aperture 23 is provided in the tube 11. This aperture makes available for manipulation a handle member 24 that is formed integrally with the member 9. The adjacent surface of the lock member 9 may be made concave, as illustrated by reference character 25 in Figs. 2, 3, and 5, to permit ready entry of the fingers of the operator.

The mode of operation of the device may now be readily described. Assuming that the coupling is in engagement as illustrated in Figs. 1 and 2, an upward movement of the member 9 by the fingers of the operator serves to free the head 1 so that there can be relative lateral movement between the coupling members. This movement is limited only by the interior surface of the tube 11, as illustrated in Fig. 5. It is, however, sufficient to free the shoulder 3 from the projection 12, and the coupling elements may now be separated.

To re-insert the coupling, it is necessary merely to bring the two coupling elements together, and the head 1 will automatically be received into the socket 8—10. This is accomplished by the aid of the sloping surfaces 13 and 26 respectively on the lower surfaces of the extensions 12 and 15. When the head 1 is first introduced into the co-operating coupling member 6—9, the head contacts the sloping surfaces 13 and 26. Further inward movement of the head 1 urges the member 9 upwardly. At the same time, surface 13 guides the head 1 toward the left. Upward movement of head 1 can continue until the shoulder 3 on the head 1 reaches the upper level of the projection 12. At that time, the head 1 can move laterally into the socket or recess 8—10; and the spring 20 returns the member 9 to its locking position. The sloping surface 26 co-operates with the head 1 to urge the coupling members into full engagement.

The inventor claims:

1. In a device of the character described: a first coupling element having a head forming an abrupt shoulder beneath the head; and a second coupling element having a pair of relatively movable parts that together define a recess for the head; one of said parts having a projection extending beneath the head; the other part being movable in a direction longitudinally of the coupling and having a longitudinally sloping surface engageable with said head, said second coupling element also having a resilient device for urging the other part into co-operative locking relation with the said one of said parts, said sloping surface by engagement with said head, serving upon movement of said other part to locking relation, to urge said head into position on said projection.

2. In a device of the character described: a first coupling element having a head forming an abrupt shoulder beneath the head; and a second coupling element having a pair of relatively movable parts that together define a recess for the head; one of said parts having a projection extending beneath the head; the other part being movable in a direction longitudinally of the coupling, said second coupling element also having a resilient device for urging the other part into co-operative locking relation with the said one of said parts; said second coupling element also including a guide means for initially receiving and guiding the head.

3. In a device of the character described: a coupling element having a head; and a co-operating coupling member defining a socket for the head and comprising: a pair of parts, one of said parts forming a lock longitudinally movable with respect to the other part; said other part having an overhanging extension projecting beneath the head, said extension having an inclined surface adapted to serve as a guide for moving the head past the extension, and to cause said head to move the lock longitudinally to open a passage for the head; and means urging said lock to active position when the head passes the extension.

4. In a device of the character described: a coupling element having a head; and a co-operating coupling member defining a socket for the head and comprising: a pair of parts, one of said parts forming a lock longitudinally movable with respect to the other part; said other part having an overhanging extension projecting beneath the head, said extension having an inclined surface adapted to serve as a guide for moving the head past the extension, and to cause said head to move the lock longitudinally to open a passage for the head; means urging said lock to active position when the head passes the extension; and a tubular guide for the head, leading to the extension and forming a space for the head large enough to pass the extension.

5. In a device of the character described: a coupling element having a head; and a co-operating coupling member defining a socket for the head and comprising: a pair of parts, one of said parts forming a lock longitudinally movable with respect to the other part; said other part having an overhanging extension projecting beneath the head, said extension having an inclined surface adapted to serve as a guide for moving the head past the extension, and to cause said head to move the lock longitudinally to open a passage for the head; and means urging said lock to active position when the head passes the extension; said lock having a sloping surface for urging the head into locking relation with the projection.

6. In a device of the character described: a coupling element having a head; and a co-operating coupling member defining a socket for the head and comprising: a pair of parts, one of said parts forming a lock longitudinally movable with respect to the other part; said other part having an overhanging extension projecting beneath the head, said extension having an inclined surface adapted to serve as a guide for moving the head past the extension, and to cause said head to move the lock longitudinally to open a passage for the head; means urging said lock to active position when the head passes the extension; and a tubular guide for the head, leading to the extension and forming a space for the head large enough to pass the extension; said lock having a sloping surface for urging the head in a direction transverse of the extension, said lock when in place restraining transverse uncoupling movement of the head.

7. In a device of the character described: a coupling element having a round head defining an abrupt shoulder below the head; and a co-operating coupling member comprising: a pair of members together defining a socket for the head, one of said members being a locking member movable longitudinally with respect to the head, and the other member having a recess which forms with the locking member a circular opening fitting the head, said other member also having an inwardly directed portion adapted to engage below the head, said locking member when in place restraining the head from uncoupling motion transverse to the socket; and a tubular guide extending below the socket; said guide, when the locking member is out of position, defining with the inwardly directed portion a space in which the head may be accommodated.

8. In a device of the character described: a coupling element having a round head defining an abrupt shoulder below the head; and a co-operating coupling member comprising: a pair of members together defining a socket for the head, one of said members being a locking member movable longitudinally with respect to the head, and the other member having a recess which forms with the locking member a circular opening fitting the head, said other member also having an inwardly directed portion adapted to engage below the head, said locking member when in place restraining the head from uncoupling motion transverse to the socket; and a tubular guide extending below the socket; said guide, when the locking member is out of position, defining with the inwardly directed portion a space in which the head may be accommodated; the co-operating end of the locking member having a sloping surface for urging the head laterally into full coupling position.

9. In a device of the character described: a coupling element having a round head defining an abrupt shoulder below the head; and a co-operating coupling comprising: a pair of members together defining a socket for the head, one of said members being a locking member movable longitudinally with respect to the head, and the other member having a recess which forms with the locking member a circular opening fitting the head, said other member also having an inwardly directed portion adapted to engage below the head, said locking member when in place restraining the head from uncoupling motion transverse to the socket; and a tubular guide extending below the socket; said guide, when the locking member is out of position, defining with the inwardly directed portion a space in which the head may be accommodated; said guide also providing a support for both the locking member and the recess forming member.

10. In a device of the character described: a coupling element having a round head defining an abrupt shoulder below the head; and a co-operating coupling member comprising: a pair of members together defining a socket for the head, one of said members being a locking member movable longitudinally with respect to the head, and the other member having a recess which forms with the locking member a circular opening fitting the head, said other member also having an inwardly directed portion adapted to engage below the head, said locking member when in place restraining the head from uncoupling motion transverse to the socket; and a tubular guide extending below the socket; said guide, when the locking member is out of position, defining with the inwardly directed portion a space in which the head may be accommodated; the pair of members together having a circular cross section, the recess forming member defining the major portion of the circle.

FREDERICK E. BERTSCHINGER.